US006184280B1

(12) United States Patent
Shibuta

(10) Patent No.: US 6,184,280 B1
(45) Date of Patent: *Feb. 6, 2001

(54) ELECTRICALLY CONDUCTIVE POLYMER COMPOSITION

(75) Inventor: Daisuke Shibuta, Saitama (JP)

(73) Assignees: Mitsubishi Materials Corporation, Tokyo (JP); Hyperion Catalysis International, Inc., Cambridge, MA (US)

( * ) Notice: Under 35 U.S.C. 154(b), the term of this patent shall be extended for 0 days.

This patent is subject to a terminal disclaimer.

(21) Appl. No.: 09/051,801

(22) PCT Filed: Oct. 22, 1996

(86) PCT No.: PCT/JP96/03051

§ 371 Date: May 19, 1998

§ 102(e) Date: May 19, 1998

(87) PCT Pub. No.: WO97/15934

PCT Pub. Date: May 1, 1997

(30) Foreign Application Priority Data

Oct. 23, 1995 (JP) ..................................................... 7-274314

(51) Int. Cl.[7] ........................................................ C08K 3/38

(52) U.S. Cl. ................. 524/405; 252/518.1; 252/519.12; 252/519.14; 252/519.15; 524/410; 524/413; 524/423; 524/430; 524/431; 524/432; 524/433; 524/443; 524/444; 524/493; 524/495; 524/499

(58) Field of Search .................................... 524/493, 495, 524/497, 430, 431, 432, 433, 405, 410, 413, 423, 443, 444; 252/519.14, 518.1, 519.15, 519.12

(56) References Cited

U.S. PATENT DOCUMENTS

| | | | | |
|---|---|---|---|---|
| 4,568,603 | * | 2/1986 | Oldham | 428/195 |
| 4,595,623 | * | 6/1986 | Dupont et al. | 428/195 |
| 4,663,230 | * | 5/1987 | Tennent | 428/367 |
| 4,734,208 | * | 3/1988 | Pall et al. | 210/767 |
| 5,098,771 | * | 3/1992 | Friend | 428/209 |
| 5,418,276 | * | 5/1995 | Machida et al. | 524/504 |
| 5,504,133 | * | 4/1996 | Murouchi et al. | 524/430 |
| 5,543,270 | * | 8/1996 | Akao et al. | 430/347 |
| 5,549,849 | * | 8/1996 | Namura et al. | 252/503 |
| 5,585,037 | * | 12/1996 | Linton | 252/518 |
| 5,611,964 | * | 3/1997 | Friend et al. | 252/511 |
| 5,814,697 | * | 9/1998 | Akao et al. | 524/495 |
| 5,876,856 | * | 3/1999 | Long | 428/446 |
| 5,908,585 | * | 6/1999 | Shibuta | 252/506 |

* cited by examiner

*Primary Examiner*—Judy M. Reddick
(74) *Attorney, Agent, or Firm*—Oblon, Spivak, McClelland, Maier & Neustadt, P.C.

(57) ABSTRACT

An electrically conductive polymer composition comprises a moldable organic polymer having hollow carbon microfibers and an electrically conductive white powder uniformly dispersed therein, the carbon fibers being present in an amount of 0.01 wt. % to less than 2 wt. % and the electrically conductive white powder being present in an amount of 2.5–40 wt. %, each percent range based on the total weight of the composition, the amounts of carbon microfibers and white powder being sufficient to simultaneously impart the desired electrical conductivity to the composition and white pigmentation to the composition.

24 Claims, No Drawings

ELECTRICALLY CONDUCTIVE POLYMER COMPOSITION

TECHNICAL FIELD

This invention relates to an electrically conductive polymer composition and particularly to a white or colored conductive polymer composition which can be used to form electrically conductive filaments (including conjugate fibers containing such filaments), films, sheets, three dimensional articles, and similar products. A conductive shaped product obtained from the composition according to this invention can be employed in antistatic mats, materials for shielding electromagnetic waves, IC trays, in construction materials such as floor and ceiling materials for clean rooms, sealing materials, tiles, and carpets, in packaging for film, dust-free clothing, and conductive parts of office equipment (rollers, gears, connectors, etc.).

BACKGROUND ART

It is well known to disperse an electrically conductive material in an electrically insulating polymer to prevent static charge or other purposes and obtain an electrically conductive polymer (see, for example, Japanese Patent Publication (Kokoku) No. 58-39175). As electrically conductive materials which are admixed with polymers, ionic or nonionic organic surfactants, metal powders, electrically conductive metal oxide powders, carbon black, carbon fibers, and the like are generally used. There are dispersed in a polymer by melting and kneading to form an electrically conductive polymer composition, which is shaped to obtain an electrically conductive article having a volume resistivity of $10^0$–$10^{10}$ Ω·cm.

It is also known that use of a material having a large aspect ratio such as flakes or whiskers as the conductive material can provide a polymer with electrical conductivity using a relatively small amount. This is because a conductive material having a large aspect ratio increases the number of contact points between the material for the same unit weight, so it is possible to obtain electrical conductivity using a smaller amount.

However, a conventional electrically conductive polymer composition has problems with respect to stability at high temperatures (heat resistance and dimensional stability), moldability, and color.

For example, when an organic surfactant is used as the conductive material, the heat resistance is poor, and the electrical conductivity is easily influenced by humidity. An inorganic conductive material is usually in the form of spherical particles, so it is necessary to mix a large quantity exceeding 50 wt % based on the total weight of the composition, so the physical properties of the polymer worsen, and its moldability into filaments or films is decreased.

Even with flake-shaped or whisker-shaped conductive materials having a large aspect ratio, it has been conventionally necessary to use them in an amount exceeding 40 wt % based on the total weight of the composition. When such a large amount of an electrically conductive material is mixed in a polymer, a directionality (anisotropy) develops at the time of shaping, and the moldability and electrical conductivity are worsened.

In the case of carbon black, if the amount required to impart electrical conductivity (generally at least 10 wt % based on the total weight of the composition) is used, the composition becomes black, and a white or colored formed product can not be obtained.

Carbon fibers, and particularly graphitized carbon fibers, have good electrical conductivity, and it has been attempted to disperse carbon fibers into a polymer as a conductive material. In particular, carbon fibers formed by vapor phase growth method (pyrolysis method) and graphitized, if necessary, by heat treatment, and which are hollow or solid with a fiber diameter of from 0.1 μm to several μm have high electrical conductivity and have attracted attention as a conductive material. However, even with such carbon fibers, when they are admixed in an amount sufficient to impart electrical conductivity, the polymer composition ends up becoming black.

Recently, carbon microfibers with a far smaller fiber diameter than carbon fibers formed by the vapor phase growth method (referred to below as hollow carbon microfibers) have been developed. See, for example, Japanese Patent Publications (Kokoku) Nos. 3-64606 and 3-77288, Japanese Patent Laid-Open (Kokai) Applications Nos. 3-287821 and 5-125619, and U.S. Pat. No. 4,663,220. These microfibers have an outer diameter of less than 0.1 μm, and normally on the order of several nanometers to several tens of nanometers. As they have a slenderness of the nanometer order, they are also referred to as nanotubes or carbon fibrils. They are usually extremely fine hollow carbon fibers having a tubular wall formed by stacking of layers of graphitized carbon atoms in a regular arrangement. These hollow carbon microfibers are used as a reinforcing material in the manufacture of composite materials, and it has been proposed to mix them into various types of resins and rubber as a conductive material. (See, for example, Japanese Patent Laid-Open (Kokai) Applications Nos. 2-232244, 2-235945, 2-276839, and 3-55709).

In Japanese Patent Laid-Open (Kokai) Application No. 3-74465, a resin composition is disclosed which is imparted electrical conductivity and/or a jet black color and which is formed from 0.1–50 parts by weight of carbon fibrils (hollow carbon microfibers) in which at least 50 wt % of the fibers are intertwined to form an aggregate, and 99.9–50 parts by weight of a synthetic resin. In that application, it is described that it is preferred to use at least 2 parts by weight of hollow carbon microfibers to impart electrical conductivity, and when imparting only a jet black color, the amount used is preferably 0.1–5 parts by weight.

As described above, carbonaceous conductive materials have excellent heat stability and can impart electrical conductivity to a polymer by using in a relatively small amount, but they have the drawback that they end up blackening the polymer. Uses for conductive polymers include antistatic mats, electromagnetic wave shield materials, IC trays, building materials, and packaging for film, and in each of these uses, there is a strong need to be able to freely perform coloring, either for reasons of visual design or to permit differentiation of products (such as in the case of IC trays).

An object of the present invention is to provide an electrically conductive polymer composition which has excellent electrical conductivity, heat resistance, and moldability, and which can be used to form a white or colored product by any melt-molding method including melt spinning, melt extrusion, and injection molding.

A more specific object of the present invention is to provide a white or freely colored electrically conductive polymer composition which uses a carbonaceous conductive material and which can be used to form a product of a desired color.

DISCLOSURE OF INVENTION

As stated above, when a carbonaceous conductive material (carbon black, carbon fibers, etc.) is blended with a polymer, the composition as a whole ends up black, so until now, it has been thought that it would be difficult to use a carbonaceous conductive material to form a white or colored (with a color other than black or gray) conductive product, and it was never attempted to make one.

The present inventors investigated the characteristics of the above-described hollow carbon microfibers as an electrically conductive material. It was found that because microfibers are extremely slender, they can impart electrical conductivity to a polymer when mixed in an amount of at least 0.01 wt % which is far less than the amount used of conventional carbon fibers. Furthermore, it was found that when the content is less than 2 wt %, the amount of blackening of the polymer by the carbon fibers decreases and can be substantially entirely hidden by the simultaneous presence in the polymer of a white powder to obtain a white conductive formable composition. Furthermore, it was found that by mixing a coloring agent in the white composition, a desired color can be obtained, thereby attaining the present invention.

Accordingly, the present invention resides in a white electrically conductive polymer composition comprising hollow carbon microfibers and an electrically conductive white powder dispersed in a moldable organic polymer. In general, it contains, with respect to the total weight of the composition, at least 0.01 wt % and less than 2 wt % of hollow carbon microfibers and 2.5–40 wt % of an electrically conductive white powder.

By further admixing a coloring agent (colored pigment, paint, etc.) with the white conductive polymer composition, an electrically conductive polymer composition having a desired color can be obtained.

In the present invention, two types of electrically conductive materials, (A) hollow carbon microfibers, which are conductive fibers, and (B) a conductive white powder, are dispersed in a moldable polymer. The use of the hollow carbon microfibers is expected to blacken the polymer, but when the amount is less than 2 wt %, by the simultaneous presence of the white powder, the blackening is counteracted, and a visually white composition can be obtained. As a result of imparting electrical conductivity by means of the hollow carbon microfibers, the amount of the electrically conductive white powder can be limited to a relatively small amount of 2.5–40 wt % necessary for whitening (hiding of the black color). If whitening is performed in this manner, and if a coloring agent is further added, coloring can be freely performed.

BEST MODE FOR CARRYING OUT THE INVENTION

The hollow carbon microfibers used in the present invention as conductive fibers are extremely fine, hollow carbon fibers obtained by the vapor phase deposition method (a method in which a carbon-containing gas such as CO or a hydrocarbon is catalytically pyrolyzed in the presence of a transition metal-containing particles whereby the carbon formed by pyrolysis grows on the particles as starting points of growth to form fibers). In general, the outer diameter of the hollow carbon microfibers is less than 0.1 $\mu$m (100 nm), and preferably they have an outer diameter of 3.5–70 nm and an aspect ratio of at least 5. Preferred hollow carbon microfibers are carbon fibrils described in U.S. Pat. No. 4,663,230 or Japanese Patent Publications (Kokoku) Nos. 3-64606 and 3-77288, or hollow graphite fibers described in Japanese Patent Laid-Open (Kokai) Application No. 5-125619.

Particularly preferred hollow carbon microfibers for use in the present invention are those commercially available from Hyperion Catalysis International, Inc. (USA) under the trademark Graphite Fibril. These are graphitic hollow microfibers with an outer diameter of 10–20 nm (0.01–0.02 $\mu$m), an inner diameter of at most 5 nm (0.005 $\mu$m), and a length of 100–20,000 nm (0.1–20 $\mu$m).

These hollow carbon microfibers have less ability to produce black coloration or to conceal than normal carbon black, and due to their extremely large aspect ratio of 5–1000, they can be bent. Preferably, the hollow carbon microfibers have a volume resistivity in bulk of at most 10 $\Omega$·cm (measured under a pressure of 100 kg/cm$^2$), and more preferably at most 1 $\Omega$·cm.

The electrically conductive white powder used in this invention performs the two functions of imparting electrical conductivity and whiteness to the polymer. However, for electrical conductivity, the hollow carbon microfibers are also present, so the amount of powder which is added can be limited to the amount necessary to produce whitening. The conductive white powder preferably has a volume resistivity of at most $10^4$ $\Omega$·cm (measured under a pressure of 100 kg/cm$^2$) and a whiteness of at least 70, and more preferably it has a volume resistivity of at most $10^3$ $\Omega$·cm and a whiteness of at least 80.

Here, the whiteness refers to the value W(Lab) calculated using the following equation from the values of L, a, and b measured by the Hunter Lab colorimetric system:

$$W(Lab)=100-[(100-L)^2+a^2+b^2]^{1/2}$$

The shape of the conductive white powder is not critical. For example, it can be from completely spherical to roughly spherical powder (collectively referred to below as roughly spherical powder), or it can be flake-shaped or whisker-shaped powder having a large aspect ratio (collectively referred to below as high aspect ratio powder). However, spherical white powder generally has a greater ability to conceal, so preferably at least a portion of the conductive white powder is roughly spherical powder.

The average particle size of the conductive white powder (the corresponding diameter in the case of roughly spherical powder, and the average value of the largest dimension in the case of flake-shaped or whisker-shaped high aspect ratio powder) is preferably 0.05–10 mm and more preferably 0.08–5 $\mu$m. More specifically, for a roughly spherical white powder, the average particle diameter is preferably at most 1 $\mu$m, and more preferably at most 0.5 $\mu$m. For a flake-shaped or whisker-shaped white powder with an aspect ratio of 10–200, the average particle diameter can be up to 10 $\mu$m or more, and preferably it is at most 5 $\mu$m.

It the average particle diameter of the electrically conductive white powder is less than 0.05 $\mu$m, the powder becomes transparent and the whiteness decreases, and in the case of the below-described surface coating-type electrically conductive white powder, the amount of surface coating increases, and this may lead to a decrease in whiteness. On the other hand, if the average particle diameter exceeds 1 $\mu$m for roughly spherical powder and exceeds 10 $\mu$m for high aspect ratio powder, particularly when the product which is formed is a film or filaments, the thickness or diameter of which is generally several $\mu$m to several hundred Aim, the smoothness of the film tends to decrease or breakage during melt spinning tends to occur.

When the electrically conductive white powder has an average particle diameter within the above-described range, the relative surface area thereof is generally in the range of 0.5–50 $m^2/g$ and preferably 3–30 $m^2/g$ for roughly spherical powder and is 0.1–10 $m^2/g$ and preferably 1–10 $m^2/g$ for high aspect ratio powder.

The electrically conductive white powder used in this invention can be (1) a white powder which itself is electrically conductive, or (2) a non-conductive white powder the surface of which is coated with a transparent or white electrically conductive metal oxide (referred to below as a surface coated conductive white powder).

An example of (1) is a white metal oxide powder, the electrical conductivity of which is increased by doping with another element. specific examples include aluminum-doped zinc oxide (abbreviated as AZO), antimony-doped tin oxide (abbreviated as ATO), and tin-doped indium oxide (abbreviated as ITO). The white powder having electrical conductivity by itself preferably has a such a particle diameter that the whiteness is at least 70. For example, when the particle diameter of ATO or ITO becomes small, the particles become transparent and the whiteness tends to decreases. For this reason, a preferred conductive white powder is AZO having a high whiteness.

Examples of a surface-coated conductive white powder (2) are nonconductive white powders such as titanium oxide, zinc oxide, silica, aluminum oxide, magnesium oxide, zirconium oxide, a titanate of an alkali metal (such as potassium titanate), aluminum borate, barium sulfate, and synthetic fluoromica with the surface thereof coated with a transparent or white electrically conductive metal oxide such as ATO, AZO, or ITO. Titanium oxide is most preferred as the nonconductive white powder because its coloring ability is greatest, but others can be used alone or in combination with titanium oxide. ATO and AZO are preferred as the conductive metal oxide for surface coating because they have good covering properties.

As a method of surface coating, a dry method (such as a method in which a conductive metal oxide is deposited by plasma pyrolysis onto a nonconductive white powder in a fluidized bed) is possible, but at present, a wet method is more suitable from an industrial viewpoint. Surface coating by a wet method can be carried out in accordance with the method described in Japanese Patent Publication (Kokoku) No. 60-49136 and U.S. Pat. No. 4,452,830, for example. This method will be explained for surface coating with ATO. An alcoholic solution containing hydrolyzable water-soluble salts of antimony and tin (such as antimony chloride and tin chloride) in predetermined proportions is gradually added to a dispersion of a nonconductive white powder (such as titanium oxide powder) in water. The chloride salts are hydrolyzed and the hydrolyzates (precursor of ATO in the form of hydroxides) are co-deposited on the titanium oxide powder so as to coat the powder. After the white powder on which the ATO precursor is deposited is collected and calcined, a white powder coated on its surface with ATO is obtained.

The amount of surface coating of the nonconductive white powder with the transparent or white conductive metal oxide is preferably such that the volume resistivity (measured at 100 $kg/cm^2$) of the white powder after surface coating is reduced to $10^4$ Ω·cm or less. The amount of coating is generally 5–40 wt % relative to the nonconductive white powder and preferably in the range of 10–30 wt %.

The amount of conductive materials used in the conductive polymer composition of this invention, in wt % based on the total weight of the composition, is at least 0.01% and less than 2%, preferably 0.05–1.5%, and more preferably 0.1–1% for the hollow carbon microfibers, and is 2.5–40%, preferably 5–35%, and more preferably 7.5–30% for the electrically conductive white powder. The larger the amount of the hollow carbon microfibers, it is preferable to also increase the amount of the electrically conductive white powder in order to counteract blackening. As a result, the electrical conductivity of the composition becomes high. Therefore, the amount of the hollow carbon microfibers can be selected in accordance with the electrical conductivity required for the use.

If the amount of the hollow carbon microfibers is less than 0.01%, it becomes difficult to impart sufficient electrical conductivity to the polymer, even if a conductive white powder is also added. On the other hand, if the amount is 2% or more, the blackening of the polymer composition becomes noticeable, and it becomes difficult to produce whitening or coloration even if a conductive white powder is present. If the amount of the conductive white powder is less than 2.5%, whitening or coloration becomes difficult, and the electrical conductivity also decreases. If the amount exceeds 40%, the amount of powder is too great, and the moldability of the polymer and the properties, particularly mechanical properties, of the molded product deteriorate.

When the conductive white powder contains a high aspect ratio powder (whether it consists solely of the high aspect ratio powder or is a mixture of that powder with a roughly spherical powder), the high aspect ratio powder has a tendency to impart directionality to the polymer. In order to avoid excessive directionality, the amount of high aspect ratio powder is preferably at most 35% and particularly at most 25%.

When only a conductive white powder is mixed with a polymer to impart electrical conductivity according to a conventional manner, it is necessary to use a large amount of the conductive white powder, i.e., at least 50% of the composition and preferably at least 60% in order to obtain sufficient electrical conductivity. In the present invention, by simultaneously using hollow carbon microfibers in a small amount of less than 2%, electrical conductivity is imparted primarily by the carbon fibers, so the amount of the conductive white powder can be reduced to the amount necessary for whitening. As a result of greatly reducing the amount of this pigment, it is possible to improve the polymer properties. Furthermore, even when the white powder has a high aspect ratio, a high directionality can be prevented, and good moldability can be maintained.

The reason that the electrical conductivity of the polymer can be increased by as little as less than 2% of carbon fibers is because hollow carbon microfibers are, as described above, extremely slender and hollow. Electrical conduction occurs along the contact points between the electrically conductive materials. Therefore, the more slender and the lower the bulk specific gravity (hollowness contributes to a low bulk specific gravity), the more contact points between fibers per unit weight. In other words, electrical conductivity can be imparted with a smaller amount of electrically conductive fibers. The hollow carbon microfibers used in this invention are extremely fine with a fiber outer diameter of at most 0.07 μm (70 nm), and normally at most several tens of nanometers, and they have a low specific gravity due to being hollow, so the number of contact points between fibers per unit weight increases, and they can impart electrical conductivity in as small an amount as less than 2%.

Furthermore, the hollow carbon microfibers act as conducting wires linking the electrically conductive white powder. Namely, even if particles of the white powder are not directly contacting, electrical contact is maintained by the hollow carbon microfibers, and this is thought to further contribute to electrical conductivity.

The hollow carbon microfibers used in the present invention have an outer diameter of at most 70 nm, which is shorter than the shortest wavelength of visible light. Therefore, visible light is not absorbed and passes through them, so it is thought that when present in a small amount of less than 2%, the presence of the carbon fibers does not substantially affect the whiteness. Furthermore, as stated above, the amount of the carbon fibers is not large enough to produce directionality of the polymer, so the moldability is not impeded.

In Japanese Patent Laid-Open (Kokai) Application No. 3-74465, a polymer composition is made jet black by using 0.1–5 wt %, based on the weight of the composition, of hollow carbon microfibers (carbon fibrils), and it is written that mixing of at least 2 wt % is desirable to impart electrical conductivity. In contrast, in the present invention, when less than 2 wt % is used, the color does not become jet black, and electrical conductivity can be imparted. The cause of the difference is thought to be that in the composition of the above-mentioned Japanese Kokai application, at least 50 wt % of the hollow microfibers are present in the form of aggregated fibers forming an aggregate of 0.10–0.25 mm, so a large amount of fibers is necessary to obtain electrical conductivity, and even a small amount strongly blackens the polymer, In contrast, in the present invention, the hollow carbon microfibers are dispersed throughout the entire polymer, It is conjectured that due to the dispersion of the fibers and the presence of the electrically conductive white powder, when the hollow carbon microfibers are present in an amount of less than 2 wt %, blackening of the polymer composition is counteracted by the action of the white powder, and a high electrical conductivity is imparted.

The polymer used in the moldable composition according to this invention is not critical as long as it is a moldable resin, and it can be a thermoplastic resin or a thermosetting resin. Examples of suitable thermoplastic resins are polyolefins such as polyethylene and polypropylene, polyamides such as Nylon 6, Nylon 11, Nylon 66, and Nylon 6,10, polyesters such as polyethylene terephthalate and polybutylene terephthalate, and silicones. In addition, acrylonitrile, styrene, and acrylate resins, polyvinyl chloride, polyvinylidene chloride, polyvinyl acetate, polyketones, polyimides, polysulfones, polycarbonates, polyacetals, fluoroplastics, etc. can be used.

Examples of thermosetting resins which can be used in the composition of the present invention are phenolic resins, urea resins, melamine resins, epoxy resins, and polyurethane resins.

Mixing of the conductive materials (fiber and powder) with the polymer can be performed using a conventional mixing machine such as a heated roll mill, an extruder, or a melt blender which can disperse the conductive materials in the polymer in a melt or softened state. The hollow carbon microfibers and the electrically conductive white powder as the conductive materials can each be a mixture of two or more classes. The composition obtained by mixing can be shaped into a suitable formed such as pellets or particles, or it can be immediately used for molding as is.

In addition to the above-described components, the conductive polymer composition of this invention may contain one or more conventional additives such as dispersing agents, coloring agents (white powder, colored pigments, dyes, etc.), charge adjusting agents, lubricants, and antioxidizing agents. There are no particular restrictions on the types and amounts of such additives.

Addition of white powder as a coloring agent increases the whiteness of the composition. Addition of one or more colored pigments and/or dyes makes it possible to impart any desired color to the polymer composition of this invention.

There are no particular restrictions on the molding method for the conductive polymer composition according to the present invention or on the shape of the formed product. Molding can be performed by any suitable method including melt spinning, extrusion, injection molding, and compression molding, which can be appropriately selected depending on the shape of the article and the type of the resin. A melt molding method is preferred, but solution molding method is also possible in some cases. The shape of the articles can be filaments, films, sheets, rods, tubes, and three-dimensional moldings.

When the conductive polymer composition of the present invention does not contain a coloring agent, a formed product having a whiteness of at least 40 and preferably at least 50 can be obtained. If the whiteness is at least 40, coloring to a desired color with good color development can be performed by adding a coloring agent.

The product formed using a conductive polymer composition according to this invention in general has a volume resistivity of $10^0$–$10^{10}$ Ω·cm and preferably $10^1$–$10^8$ Ω·cm and a surface resistance of at most $10^{10}$ Ω/□ and preferably $10^2$–$10^9$ Ω/□. In the case of filaments, it has an excellent electrical conductivity of at most $10^{10}$ Ω per centimeter of filament.

Due to this excellent electrical conductivity, a conductive polymer composition according to this invention can be used in any application in which antistatic or electromagnetic wave-shielding properties are necessary. For example, the composition of this invention can be used to manufacture IC trays which are differentiated by color according to the type of product. Furthermore, in the manufacture of antistatic mats, building materials for clean rooms and the like, packaging materials for film, electromagnetic wave shielding materials, dust-free clothing, electrically conductive members, etc., aesthetically attractive products can be manufactured by coloring them to any desired color.

By combining the conductive polymer composition of this invention with a nonconductive polymer, a composite shaped product can be manufactured. For example, as described in Japanese Patent Laid-Open (Kokai) Application No. 57-6762, a conductive polymer composition according to this invention and a common nonconductive polymer can be melt-spun together through a conjugate fiber spinneret having at least two orifices, and a conjugate filament having a conductive part and a nonconductive part in its cross section can be spun. Using such conjugated filaments, an antistatic fiber product (such as an antistatic mat, dust-free clothing, and carpets) having a drape better than those formed of conductive filaments which are entirely composed of a conductive polymer composition can be manufactured. In the case of films and sheets, the composition can be laminated with a nonconductive polymer.

EXAMPLES

The following examples are presented to further illustrate the present invention. These examples are to be considered in all respects as illustrative and not restrictive. In the example, all parts and % are by weight unless otherwise specified.

The electrically conductive materials used in the examples were as follows.

1. hollow carbon microfibers - Graphite Fibril BN and CC (tradenames of Hyperion Catalysis International, Inc.). Graphite Fibril BN is a hollow fiber with an outer diameter of 0.015 μm (15 nm), an inner diameter of 0.005 μm (5 nm), a length of 0.1–10 μm (100–10,000 nm), and a volume resistivity in bulk (measured under a pressure of 100 kg/cm$^2$) of 0.2 Ω·cm. Graphite fibril CC is a hollow fiber with an outer diameter of 0.015 μm (15 nm), an inner diameter of 0.005 μm (5 nm), a length of 0.2–20 μm (200–20,000 nm), and a volume resistivity in bulk of 0.1 Ω·cm.

2. ATO-coated titanium dioxide powder: Spherical titanium oxide powder (W-P made by Mitsubishi Materials, average particle diameter of 0.2 μm and a specific surface area of 10 $m^2/g$) coated with 15% ATO. It had a volume resistivity of 1.8 Ω·cm at a pressure of 100 $kg/cm^2$ and a whiteness of 82.

3. ATO-coated fluoromica powder: Synthetic fluoromica powder (W-MF made by Mitsubishi Materials, average particle diameter of 2 μm, aspect ratio of 30, specific surface area of 3.8 $m^2/g$) coated with 25% ATO. It had a volume resistivity of 20 Ω·cm at a pressure of 100 $kg/cm^2$ and a whiteness of 81.

4. AZO powder: Spherical Al-doped zinc oxide powder (23-K made by Hakusui Chemical, average particle diameter of 0.25 μm, volume resistivity of $10^2$ Ω·cm at a pressure of 100 $kg/cm^2$, and a whiteness of 75).

5. Electrically conductive carbon black (abbreviated CB) (#3250 made by Mitsubishi Chemical, average particle diameter of 28 nm), which was used as a comparative carbonaceous electrically conductive material.

The following materials were used as a polymer.

1. Low-density polyethylene resin (Showlex F171 made by Showa Denko).

2. Nylon 6 (Novamide 1030 made by Mitsubishi Chemical).

3. Silicone rubber (X-31 made by Shin-Etsu Chemical).

The surface resistance in the examples was the value measured with an insulation-resistance tester (Model SM 8210 made by Toa Denpa). The volume resistivity was the value measured with a digital multimeter (Model 7561 made by Yokogawa Electric). Whiteness was measured using a calorimeter (Color Computer SM7 made by Suga Testing Instruments).

Example 1

1 part of hollow carbon microfibers (Graphite Fibril BN), 29 parts of ATO-coated titanium dioxide powder, and 70 parts of polyester resin were melt-blended in a roll mill at 175° C. so as to distribute the fibers and the powder uniformly in the resin. The resulting conductive polymer composition was pelletized, and the pellets were melt-extruded into a 75 μm-thick film. The resulting white conductive film had a surface resistance of $2\times10^5$ Ω/□ and a whiteness of 49.

The above procedure was repeated to form a conductive white film while varying the amount of the conductive materials or by omitting the hollow carbon microfibers or by using conductive carbon black instead. The results and the composition are shown in Table 1.

The results of another series of test runs in which Graphite Fibril CC was used as the hollow carbon microfibers are shown in Table 2.

As can be seen from the above tables, when hollow carbon microfibers were not employed, the film had a high whiteness, but electrical conductivity could not be developed. In contrast, by adding but a minute quantity of 0.5–1.5% of hollow carbon microfibers, the film had a sufficient electrical conductivity while a whiteness of at least 40 was maintained. On the other hand, when the same amount of carbon black was added instead of hollow carbon microfibers, electrical conductivity was not attained, and the film was essentially black.

TABLE 1

| Run | Composition (wt %) | | | | Surface Resist. | | |
|---|---|---|---|---|---|---|---|
| No. | Resin | GF | CB | ATO | Ω/□ | Whiteness | |
| 1 | 70 | 0.5 | — | 29.5 | $3 \times 10^8$ | 53 | TI |
| 2 | 70 | 1.0 | — | 29.0 | $2 \times 10^5$ | 49 | TI |
| 3 | 70 | 1.5 | — | 28.5 | $9 \times 10^3$ | 44 | TI |
| 4 | 70 | — | — | 30 | $>10^{12}$ | 71 | CO |
| 5 | 70 | — | 1 | 29.0 | $>10^{12}$ | 21 | CO |

Resin: Polyethylene,
GF = Graphite Fibril BN
CB = Carbon Black,
ATO = ATO-coated titanium oxide powder
TI = This Invention,
CO = Comparative

TABLE 2

| Run | Composition (wt %) | | | | Surface Resist. | | |
|---|---|---|---|---|---|---|---|
| No. | Resin | GF | ATO | Mica | Ω/□ | Whiteness | |
| 1 | 70 | 0.5 | 29.5 | — | $1 \times 10^6$ | 55 | TI |
| 2 | 70 | 1.0 | 29.0 | — | $6 \times 10^3$ | 51 | TI |
| 3 | 70 | 1.5 | 28.5 | — | $7 \times 10^2$ | 44 | TI |
| 4 | 65 | 0.5 | 24.5 | 10 | $5 \times 10^5$ | 54 | TI |

Resin: Polyethylene,
GF = Graphite Fibril CC
ATO = ATO-coated titanium oxide powder
Mica = ATO-coated synthetic fluoromica
TI = This Invention

Example 2

0.5 parts of hollow carbon microfibers (Graphite Fibril CC), 24.5 parts of ATO-coated titanium dioxide powder, and 75 parts of nylon 6 resin were melt-blended at 250° C. in a twin-screw extruder. The resulting conductive polymer composition was pelletized, and the pellets were melt-spun through a melt spinning machine to form 12.5 denier Nylon filaments. The resulting filaments had an electrical resistance of $4\times10^8$ Ω per cm of filament and a whiteness of 52.

The above process was repeated while varying the amount of the conductive materials or by substituting carbon black for hollow carbon microfibers. The results and the blend compositions are shown in Table 3.

TABLE 3

| Run | Composition (wt %) | | | | Electric Resist. | | |
|---|---|---|---|---|---|---|---|
| No. | Resin | GF | CB | ATO | Ω/cm | Whiteness | |
| 1 | 75 | 0.5 | — | 24.5 | $4 \times 10^8$ | 52 | TI |
| 2 | 70 | 1.0 | — | 29.0 | $5 \times 10^6$ | 44 | TI |
| 3 | 70 | — | 1.0 | 29.0 | $>10^{12}$ | 28 | CO |
| 4 | 40 | — | 1.0 | 59.0 | $7 \times 10^{10}$ | 35* | CO |

Resin: 6 Nylon,
GF = Graphite Fibril CC
CB = Carbon Black,
ATO = ATO-coated titanium oxide powder
TI = This Invention,
CO = Comparative
*Breakage of filaments occurred during spinning By comparing Tests Nos. 2 and 3, it can be seen that electrical conductivity was not obtained when hollow carbon microfibers were replaced by the same amount of carbon black. On the other hand, as shown in Run No. 4, if the amount of electrically conductive white powder was increased to 50% or more, electrical conductivity was exhibited, but the electrical conductivity was lower than for the present invention. Moreover, due to blending a large amount of powder, breakage of filaments occurred during melt spinning, and the moldability was greatly decreased.

Example 3

0.075 parts of hollow carbon microfibers (Graphite Fibril CC), 19.925 parts of ATO-coated titanium oxide powder, and 80 parts of silicone rubber were uniformly mixed in a roll mill to obtain a semi-fluid conductive polymer composition which is suitable as a conductive sealant, for example. The volume resistivity of this rubbery composition was $9\times10^9$ Ω·cm and it had a whiteness of 69.

The above process was repeated while varying the amount of the electrically conductive materials or by also including ATO-coated fluoromica powder in the electrically conductive materials to obtain a conductive polymer composition. The results and the composition of the blend are shown in Table 4. Electrical conductivity was obtained using only 0.075% of hollow carbon microfibers. It can also be seen that simultaneous use of flake-shaped electrically conductive white powder is effective.

TABLE 4

| Run | Composition (wt %) | | | | Volume Resist. | | |
|---|---|---|---|---|---|---|---|
| No. | Resin | GF | ATO | Mica | Ω · cm | Whiteness | |
| 1 | 80 | 0.075 | 19.925 | — | $9 \times 10^9$ | 69 | TI |
| 2 | 80 | 0.3 | 19.7 | — | $3 \times 10^6$ | 51 | TI |
| 3 | 80 | 1.0 | 19.0 | — | $7 \times 10^2$ | 42 | TI |
| 4 | 65 | 1.8 | 33.2 | — | $7 \times 10^0$ | 41 | TI |
| 5 | 90 | 0.3 | 9.7 | — | $8 \times 10^6$ | 46 | TI |
| 6 | 70 | 0.3 | 9.7 | 20 | $3 \times 10^5$ | 58 | TI |

Resin: Sillicone rubber,
GF = Graphite Fibril CC
ATO = ATO-coated titanium oxide powder
Mica = ATO-coated synthetic fluoromica
TI = This Invention Example 4

0.3 parts of Graphite Fibril CC, 34.7 parts of AZO powder, and 65 parts of silicone rubber were uniformly mixed in a roll mill to obtain a semi-fluid conductive polymer composition similar to that of Example 3. This rubbery composition had a volume resistivity of $8\times10^6$ Ω·cm and a whiteness of 55.

The above process was repeated while varying the amount of the electrically conductive materials to prepare a conductive polymer composition. The results and the blend composition are shown in Table 5. Even when the white powder was AZO powder which itself is electrically conductive, a high whiteness and electrical conductivity could be obtained.

TABLE 5

| Run | Composition (wt %) | | | Volume Resist. | | |
|---|---|---|---|---|---|---|
| No. | Resin | GF | AZO | Ω · cm | Whiteness | |
| 1 | 65 | 0.3 | 34.7 | $8 \times 10^6$ | 55 | TI |
| 2 | 65 | 1.0 | 34.0 | $1 \times 10^3$ | 43 | TI |

Resin: Sillicone rubber,
GF = Graphite Fibril CC
AZO = Al-doped zinc oxide powder
TI = This Invention

INDUSTRIAL APPLICABILITY

Even though an electrically conductive polymer composition of this invention contains hollow carbon microfibers which are a class of carbon fibers, the amount thereof is limited to less than 2 wt %, and by the concurrent presence of an electrically conductive white powder, blackening due to the carbon fibers is suppressed, and it can form molded products having a white outer appearance and excellent electrical conductivity. The conductive polymer composition can be white or-can be freely colored to a desired color by use of a coloring agent to give aesthetically attractive conductive products.

Furthermore, by including hollow carbon microfibers which impart high electrical conductivity, the amount of electrically conductive white powder can be decreased, and a deterioration in the physical properties of molded product due to a large amount of conductive powder can be avoided. Since the amount of carbon fibers is small, a decrease in moldability can also be avoided. In addition, the conductive materials produces a reinforcing and packing effect, and the resulting molded product has excellent mechanical properties such as dimensional stability and tensile strength.

Thus, the conductive polymer composition can be used to manufacture various products having antistatic or electromagnetic wave-shielding functions, and it can be used to manufacture products which have an attractive appearance or which can be differentiated by color.

What is claimed is:

1. An electrically conductive polymer composition, comprising:

a moldable organic polymer having hollow carbon microfibers and an electrically conductive white powder uniformly dispersed therein, said carbon microfibers being present in an amount of 0.01 wt. % to less than 2 wt. % and said electrically conductive white powder being present in an amount of 2.5–40 wt. %, each percent range based on the total weight of the composition, said amounts of carbon microfibers and white powder being sufficient to simultaneously impart desired electrical conductivity to the composition and white pigmentation to the composition.

2. The electrically conductive polymer composition according to claim 1, wherein the hollow carbon microfibers have an outer diameter of 3.5–70 nm and an aspect ratio of at least 5.

3. The electrically conductive polymer composition according to claim 1, wherein the electrically conductive white powder has a volume resistivity (measured at 100 $kg/cm^2$) of at most $10^4$ Ω·cm and a whiteness of at least 70.

4. The electrically conductive polymer composition according to claim 3, wherein the electrically conductive white powder is aluminum-doped zinc oxide powder or a surface-coated white powder selected from the group consisting of titanium oxide, zinc oxide, silica, aluminum oxide, magnesium oxide, zirconium oxide, an alkali metal titanate, aluminum borate, barium sulfate, and synthetic fluoromica each having a surface coating of an electrically conductive metal oxide selected from the group consisting of antimony-doped tin oxide, aluminum-doped zinc oxide and tin-doped indium oxide.

5. The electrically conductive polymer composition according to claim 3, wherein said volume resistivity is at most $10^3$ Ω·cm and said whiteness is at least 80.

6. The electrically conductive polymer composition according to claim 1, wherein said electrically conductive white powder is spherical having an average particle diameter of at most 1 μm.

7. The electrically conductive polymer composition according to claim 1, wherein said white powder is flake-shaped or whisker-shaped with an aspect ratio of 10–200 and an average particle diameter up to 10 μm.

8. The electrically conductive polymer composition according to claim 1, wherein the surface area of the electrically conductive white powder ranges from 0.5–50 $m^2/g$ for spherical powder and from 0.1–10 $m^2/g$ for high aspect ratio powder.

9. The electrically conductive polymer composition according to claim 4, wherein said electrically conductive white powder is non-conductive white powder coated with transparent or white conductive metal oxide with the result that the volume resistivity (measured at 100 $kg/cm^2$) of the white powder after surface coating is reduced to $10^4$ Ω·cm or less, and wherein the amount of coating ranges from 5–40 wt. % relative to the non-conductive white powder.

10. The electrically conductive polymer composition according to claim 1, wherein the amount of said hollow microfibers ranges from 0.05–1.5 wt. % and the amount of said electrically conductive white powder ranges from 5–35 wt. %.

11. The electrically conductive polymer composition according to claim 1, wherein said organic polymer is a thermoplastic resin selected from the group consisting of polyolefins, polyamides, polyesters, silicones, acrylonitrile resins, styrene resins, acrylate resins, polyvinyl chloride, polyvinylidene chloride, polyvinyl acetate, polyketones, polyimides, polysulfones, polycarbonates, polyacetals and fluoroplastics.

12. The electrically conductive polymer composition according to claim 1, wherein said organic polymer is a thermosetting resin selected from the group consisting of phenolic resins, urea resins, melamine resins, epoxy resins and polyurethane resins.

13. An electrically conductive polymer composition, comprising:

a moldable organic polymer having hollow carbon microfibers and an electrically conductive white powder and a coloring agent uniformly dispersed therein, the resulting composition having the desired electrical conductivity and pigmented to a color which is not black or gray.

14. The electrically conductive polymer composition according to claim 13, wherein the hollow carbon microfibers have an outer diameter of 3.5–70 nm and an aspect ratio of at least 5.

15. The electrically conductive polymer composition according to claim 13, wherein the electrically conductive white powder has a volume resistivity (measured at 100 $kg/cm^2$) of at most $10^4$ Ω·cm and a whiteness of at least 70.

16. The electrically conductive polymer composition according to claim 15, wherein the electrically conductive white powder is aluminum-doped zinc oxide powder or a surface-coated white powder selected from the group consisting of titanium oxide, zinc oxide, silica, aluminum oxide, magnesium oxide, zirconium oxide, an alkali metal titanate, aluminum borate, barium sulfate, and synthetic fluoromica each having a surface coating of an electrically conductive metal oxide selected from the group consisting of antimony-doped tin oxide, aluminum-doped zinc oxide and tin-doped indium oxide.

17. The electrically conductive polymer composition according to claim 15, wherein said volume resistivity is at most $10^3$ Ω·cm and said whiteness is at least 80.

18. The electrically conductive polymer composition according to claim 13, wherein said electrically conductive white powder is spherical having an average particle diameter of at most 1 μm.

19. The electrically conductive polymer composition according to claim 13, wherein said white powder is flake-shaped or whisker-shaped with an aspect ratio of 10–200 and an average particle diameter up to 10 μm.

20. The electrically conductive polymer composition according to claim 13, wherein the surface area of the electrically conductive white powder ranges from 0.5–50 $m^2/g$ for spherical powder and from 0.1–10 $m^2/g$ for high aspect ratio powder.

21. The electrically conductive polymer composition according to claim 15, wherein said electrically conductive white powder is non-conductive white powder coated with transparent or white conductive metal oxide with the result that the volume resistivity (measured at 100 $kg/cm^2$) of the white powder after surface coating is reduced to $10^4$ Ω·cm or less, and wherein the amount of coating ranges from 5–40 wt. % relative to the non-conductive white powder.

22. The electrically conductive polymer composition according to claim 13, wherein the amount of said hollow microfibers ranges from 0.05–1.5 wt. % and the amount of said electrically conductive white powder ranges from 5–35 wt. %, each percent range based on the total weight of the composition.

23. The electrically conductive polymer composition according to claim 13, wherein said organic polymer is a thermoplastic resin selected from the group consisting of polyolefins, polyamides, polyesters, silicones, acrylonitrile resins, styrene resins, acrylate resins, polyvinyl chloride, polyvinylidene chloride, polyvinyl acetate, polyketones, polyimides, polysulfones, polycarbonates, polyacetals and fluoroplastics.

24. The electrically conductive polymer composition according to claim 13, wherein said organic polymer is a thermosetting resin selected from the group consisting of phenolic resins, urea resins, melamine resins, epoxy resins and polyurethane resins.

* * * * *